Sept. 24, 1963 W. KOENIG, JR 3,105,114

SIGNALING SYSTEM

Filed April 12, 1944 2 Sheets-Sheet 1

INVENTOR
W. KOENIG, JR.
BY H. A. Burgess
ATTORNEY

INVENTOR
W. KOENIG, JR.
BY H. A. Burgess
ATTORNEY

United States Patent Office 3,105,114
Patented Sept. 24, 1963

3,105,114
SIGNALING SYSTEM

Walter Koenig, Jr., Clifton, N.J., assignor to Bell Telephone Laboratories, Incorporated, New York, N.Y., a corporation of New York Filed Apr. 12, 1944, Ser. No. 530,684
16 Claims. (Cl. 179—1.5)

The present invention relates to a privacy system of transmission of signals such as speech or other type of signals, in which the signals are divided into elements of short time of duration which are variously delayed to place them in abnormal sequence before transmission.

In such systems the difficulty of decoding the signal by outsiders is considerably increased if a non-repetitive scheme of coding can be used, or at least an extremely long coding cycle. One way of doing this is to provide switches for changing the circuit connections which determine the order in which the signal elements are to be sent and then to vary the operation of these switches in an irregular and non-recurrent manner. If a magnetic storage tape and plurality of reproducer or recorder magnets are used to introduce delay and if a commutator or distributor is used to control the time order of switching the magnets into the signaling circuit, the switches referred to can, for example, vary the wiring of the distributor so as to connect the magnets in circuit in varying sequences. One way of insuring a non-repeating irregular control of the switches is to provide for their actuation by or in accordance with currents having a random type distribution with time.

It is found that in addition to the above-mentioned features, it is also necessary to provide some form of exclusion circuit or apparatus which will distinguish between the random type control currents which can be used at any instant and those which must be rejected because they would produce false coding. If the random currents were used without such discrimination, many of the signal elements would not be sent at all and others would be repeatedly sent either two or more times. The exclusion apparatus must take note of those random currents which would produce false coding and in each case substitute a current which will avoid either repetition of the same signal element or dropping out of any signal element.

The present invention is concerned with a compact privacy system having a number of novel features including a generator of highly irregular coding or control currents capable of a very long operational cycle, a commutator or distributor of special construction and an exclusion mechanism of simple type, the general object being a simplified type of system which can be built in compact form for portable use.

Figure 1:
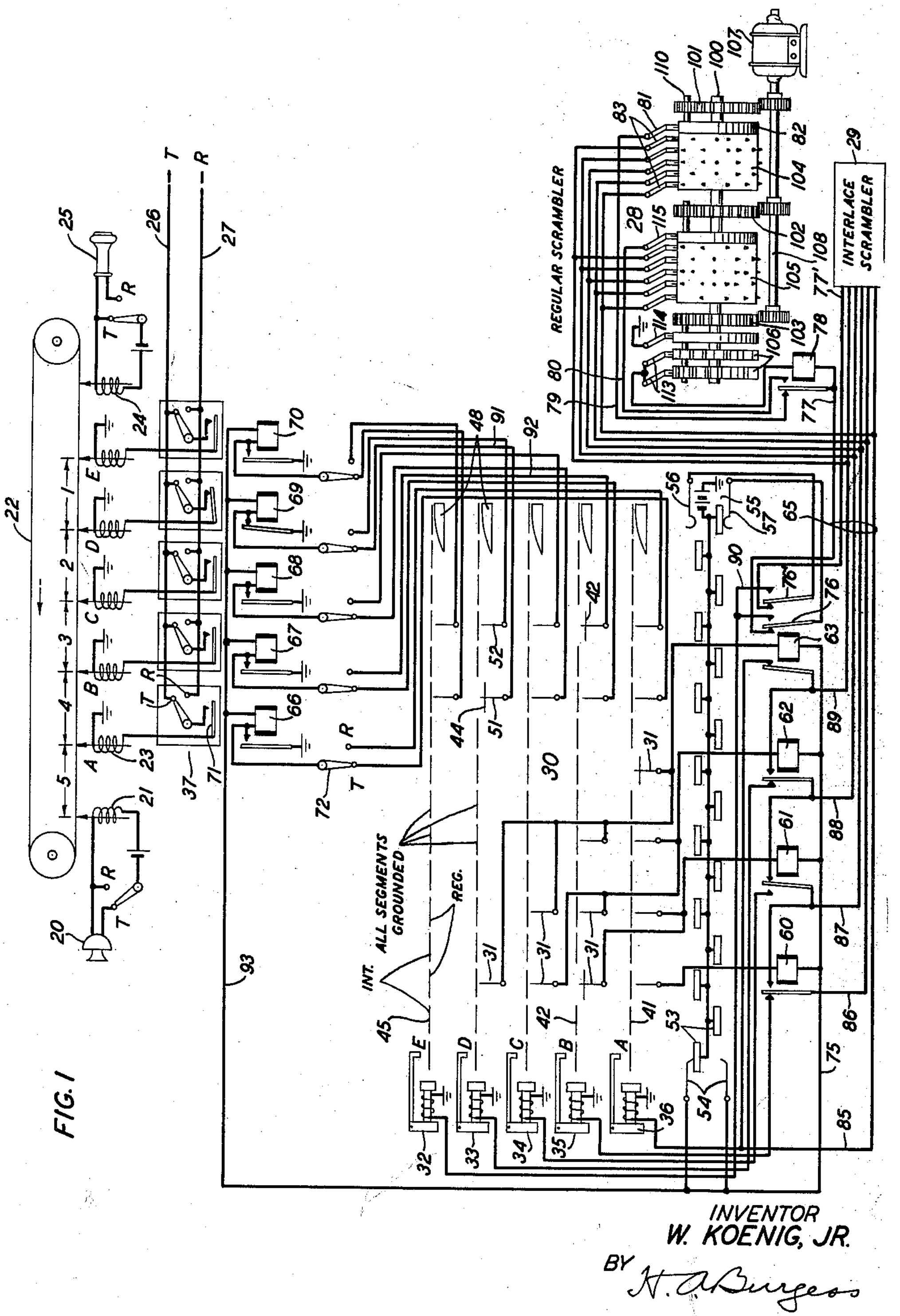
Figure 2:
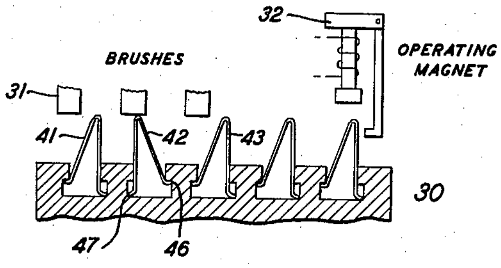
Figure 3:
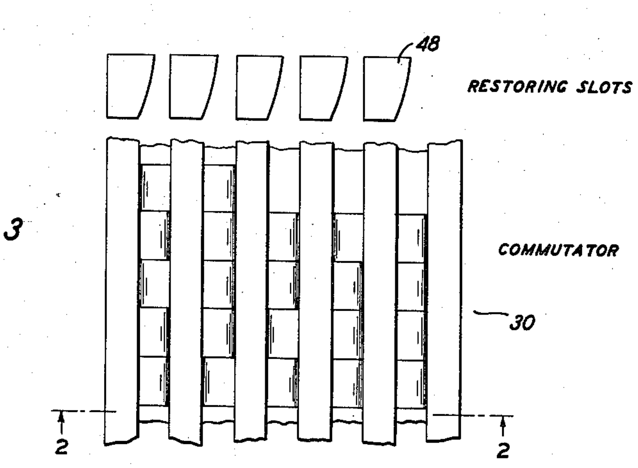
Figure 4:
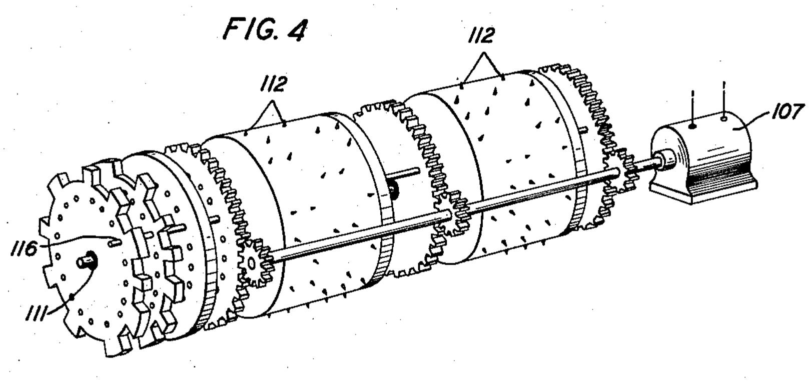

The nature and objects of the invention, together with its various features, will be more fully understood from the following detailed description of the illustrative embodiment disclosed in the accompanying drawings, in which:

FIG. 1 is an over-all schematic diagram of a complete two-way terminal of a telephone privacy system in accordance with the invention;

FIGS. 2 and 3 are detail views of the novel storing commutator of the invention, FIG. 2 being a partial section through a portion of the surface of the commutator at 2—2 in FIG. 3 and showing the manner of operating the displaceable contactors, and FIG. 3 showing a portion of the surface of the commutator developed in plan, with the restoring slots; and FIG. 4 is a partial view in perspective of one of the scramblers showing one manner of using a common drive to secure different rates of rotation of the different drums.

The commutator shown developed in FIG. 1 at 30 and shown also in FIGS. 2 and 3 has mechanically displaceable contactors which serve both to preselect and store the code designations and to perform circuit closures when they pass under brushes in sets 31, 51 and 52 which bear upon only those contactors which have been displaced to one side. Five separate rows 41 to 45 of such contactors are shown, the contactors of each row being normally aligned and spring-biased to an upper position in FIG. 1 and to the right in FIGS. 2 and 3 by feet which are positioned in a corresponding slot and which exert outward pressure against the sides of the slot. There are five actuating magnets 32 to 36 in FIG. 1 which when energized by a current impulse strike their hammer-like armatures downward in FIG. 1 (or to the left in FIG. 2) to cause the corresponding contactor to snap over from its normal to its operated position. These contactors are biased to whichever extreme position they are in by the spring pressure of their feet against the sides of the slot. It will be noted from FIG. 2 that in either extreme position a contactor has its feet at diagonally opposite corners of the slot, and is equally stable in either position.

FIG. 2 also illustrates how the brushes 31 entirely miss the normally aligned contactors 41 and 43 but make electrical contact with the contactor 42 which has been displaced into operative position. The brush can exert enough pressure on the contactor 42 to insure good electrical contact without danger of restoring the contactor since downward pressure on contactor 42 (FIG. 2) tends to maintain it in its operated position. The contactors are not easily tipped by the drag of the brush in the direction of movement of the commutator (along a slot) since one of their feet engages shoulder 46 and the other engages the lower corner 47 of the slot and the width of the spring material out of which the contactors are made can be great enough to insure stable operation. After the operated contactors have passed under all of the brushes in one rotation or operational period, they are restored to normal by the restoring cams or slots 48 which are stationary and which force the operated contactors to the right in FIG. 3 or upwards in FIG. 1. The entire commutator including the drum in which the circumferential grooves are cut, and the spring contactors, are at ground potential by grounding the frame (not shown) of the commutator or in other suitable manner.

The disclosure of the commutator 30 in FIG. 1 is mostly from the standpoint of its circuit functions and the drum itself and its slots are not indicated. These slots would run horizontally if shown in FIG. 1 and the contactors are indicated merely by short dash lines. As illustrated, there are sixteen contactors in each horizontal row (each slot), eight of these being "regular" contactors, and these alternating with eight "interlaced" contactors, although this number is not limiting in any sense. The method of operation is such that only one contactor in each vertical row in FIG. 1 is operated in any one rotation. There is thus presented to the brushes, first a row of regular contactors and then a row of interlaced contactors, one after the other.

The commutator takes part in two different functions, and for this purpose two classes of brushes are shown, the first class 31 having to do with the memory function for determining exclusions of unusable code elements and the second class 51, 52 doing the actual coding or decoding of the transmitted or received speech. A special ring of staggered commutator segments 53 of the ordinary type is shown just below the commutator 30 in FIG. 1 for cooperating with brushes 54 in supplying accurately timed impulses of direct current from battery 55. For this purpose the segments 53 are mounted on the same drum that carries the commutator structure 30 but are insulated therefrom and are permanently connected to battery 55 by means of a slip ring (not shown).

A group of four exclusion relays 60 to 63 is shown each having one terminal of its winding connected to one or more of the brushes 31 as will be more fully described. The armatures of these relays are connected to a group of conductors 65 leading to the right where they connect to brushes of the regular scrambler 28 (and of the interlace scrambler 29 if used). The purpose of the scrambler is to supply battery current over one or another of the various leads in conductor group 65 in irregular order. Ideally the battery would be applied to these leads in random manner and this ideal is approached by the scrambler, which will be described in detail at a later point.

Reference will now be made to the part of the system in which the speech currents themselves flow. Any suitable type of speech transmitting circuit indicated diagrammatically by the microphone 20 is connected to a recording magnet 21 cooperating with the traveling magnetizable tape 22 traveling in the direction of the arrow. Spaced along the tape 22 at equal intervals is a series of recording-reproducing magnets 23, which when acting as reproducers, pick up the recorded speech with different amounts of time delay. There are five such magnets shown in this figure, although any desired number may be used in practice.

These coils 23 are used as reproducing coils in the transmitting condition, and they serve as recording coils in the receiving condition to set up fragments of speech in the tape 22 in such an order that when the recorded material passes over the pick-up coil 24 normal speech is received in the receiver indicated diagrammatically at 25.

A transmitting line branch is indicated at 26 and a receiving line branch at 27. These may extend to a radio transmitter and radio receiver, respectively, or to the transmitting and receiving sides of any suitable transmission channel. A number of two-position TR switches are shown at various points in the circuit which will all be thrown in unison to the T position when a push-to-talk button (not shown) is pressed and will be thrown to the R position when the button is released. Any known type of mechanism for controlling the switches can be used, for example, relays whose windings are all connected to be closed and opened by actuation of the talking button. Coils 21 and 24 also act as erase coils in one position of the TR switches.

Five switching boxes 37 are shown just below the coils 23 for connecting these coils either to the transmitting branch 26 or the receiving branch 27 under control of TR switches shown in the boxes. These switching boxes 37 each contain an armature 71 controlled from the corresponding relay 66, 67, 68, 69 or 70 situated immediately below the respective box. The contacts controlled by the armatures 71 are open at all times except when the corresponding relay 66 to 70 is energized. The coils 23 are therefore not connected to either the transmit line 26 or receive line 27 except at such times as the contacts of the armatures 71 are closed.

It is a function of the scrambler 28 (or 28 and 29 in case two scramblers are used), commutator 30 and code relays 66 to 70 to switch the reproducer coils 23 into the transmitting line 26 in irregular order when speech is being transmitted and to switch them in circuit with the receiving line 27 also in an irregular order when speech is being received such as to restore the speech to normal in the receiver 25. For this purpose the relays 66 to 70 are energized in irregular manner from the brushes 51 when transmitting and from brushes 52 when receiving, these brushes applying grounds to the individual windings by way of the TR switches 72.

It is necessary that the transmitting and receiving codes used in two intercommunicating stations be properly correlated so that the received scrambled message will be successfully unscrambled. The fact that, in transmitting, the scrambling is done in taking the speech segments off the tape (scramble on reproduce) while, in receiving, the unscrambling is done in recording the speech segments on the tape (scramble on record), makes it possible to use scrambler apparatus 28 and/or 29 at one station which is an exact duplicate of the scrambler apparatus used at the opposite station. They are started in phase coincidence with each other at the opposite stations and are run in close synchronism. In practice a single drive may be used at a station for timing the scrambler, for rotating the commutator 30 and for driving the magnetic tape 22. Synchronism of all of the parts is obtained between the different stations by insuring that the common driving means at one station runs in close synchronism with that of the other station, as may be done by means known in the art.

Before describing the circuit operation in detail it will be necessary to consider some of the restrictions which must be observed in coding and decoding. The five coils 23 are labeled A to E in the drawing and recorded speech on the tape is arbitrarily designated by the numbers 1, 2, 3, 4, and 5, these referring to the fragment of speech that is recorded on the wire between one coil and the next. It will be assumed that at the instant under consideration speech elements 1 and 2 have already been transmitted (when these elements passed one of the coils A, B or C). Therefore, at the instant under consideration, coils D and E must be excluded in order not to repeat either speech segment 1 or 2. This leaves coils A, B and C available for selection and any one of them may be selected for coding purposes. One time unit later speech element 1 has passed beyond coil E and speech element 2 is now in position to be reproduced by coil E. Since speech element 2 has already been sent, it is necessary in this time interval to exclude coil E. It is necessary to exclude one other coil also, depending upon which coil A, B or C was selected in the previous time interval. It is seen from these considerations that under the present assumptions two coils must always be excluded and three other coils (always including coil A) are available for selection. It is also noted that if coil A is used at a particular time interval it is necessary to exclude coil B in the next time interval and, successively, coils C, D and E in the next succeeding time intervals in order not to repeat the same speech element. It is further noted that unless coil E is excluded at a particular moment it must be selected, since otherwise a speech element would be lost through failure to transmit it previously.

Reference will now be made to the commutator 30 and its manner of operation in connection with the rest of the system. It will be assumed first of all that exclusion relay 63 is operated as indicated in the drawing so that when the ring of segments 53 is connecting battery 55 to brush 57 battery is supplied over the armature 76 and front contact and lead 77 to the armature of relay 78. It will be assumed that at a particular moment relay 78 is not energized, and, therefore, the battery is extended over lead 79 to brush 81, slip ring 82 and one of the five brushes 83 to one of the leads of the group 65. If this lead happens to be lead 85, the battery current is brought to the winding of selector relay 36 which attracts its armature and moves the corresponding contactor 41 from normal to operated position, that is, downward in FIG. 1. If the battery current had come in from the scrambler on lead 86, assuming exclusion relay 60 unoperated, the current would have been applied to the winding of selector relay 35. Similarly, selector 33 or 34 would be operated by current supplied over lead 88 or 87 provided the corresponding exclusion relays 62 and 61 were unoperated. If exclusion relay 63 is assumed unoperated rather than operated, this means that coil E is not excluded and, therefore, must be selected regardless of which lead may be indicated by the operation of the scrambler. In this condition, therefore, it is not necessary to supply battery from either brush 56 or 57 to one of the scramblers over lead 77 or 77' but this battery current can be supplied directly through the back contact of armature 76 or 76' of exclusion relay 63 and over lead 90 directly to the winding of selector magnet 32. As long as coil E remains unexcluded, selector magnet 32 will be actuated each time brush 56 or 57 makes contact with one of the segments 53 and will continue to set the contactors in the upper row into position to select coil E.

FIG. 1 illustrates two of the exclusion relays 61 and 63 as operated, these corresponding to coils C and E. Since coil A is never excluded, this leaves coils A, B and D in condition to be selected with the circuit conditions as illustrated. Exclusion relay 61 is operated because the upper of the two brushes 31 to which its winding is permanently connected is making contact with a previously operated contactor 42, thus applying ground to winding 61 and causing this relay to be operated by battery current received over brush 54 and lead 75. Disregarding for the moment the intermediate sets of interlace contactors on commutator 30, it will be noted that one full time interval later exclusion relay 62 will be operated by this same operated regular contactor which will then be underneath the middle of the three brushes 31 to which the winding of relay 62 is connected. Similarly, this same operated contactor will energize relay 63 in the next following regular interval. At the moment indicated in the drawing, exclusion relay 63 is operated from its lowermost brush 31 which is making contact with an operated contactor 41 in the lowest row. It is noted that relay 63 can be operated from any one of four brushes and the arrangement is such that it is excluded if coil D is selected in the next previous interval, coil C in the second previous interval, coil B in the third previous interval and coil A in the fourth previous interval. A similar rule is followed in the case of the other exclusion relays. It is thus seen that the portion of the commutator 30 that is passing from the selector magnets 32 to 36 up to the last brush 31 performs a memory function for aiding in the exclusion process and that the same operating contactors which control operation of the exclusion relays now pass along under the other sets of brushes 51 and 52 and control the actual selection of the coils A to E.

The exclusion relays operate to translate an unusable code designation into a usable one. This may be seen by exclusion relay 61, by way of example. As noted above, this relay is operated because of the selection of coil B in the next previous regular interval. It is, therefore, necessary to exclude the selection of coil C, that is, to exclude selector magnet 34, in the instant under consideration. If battery is supplied from the scrambler over lead 87 which would normally result in actuating magnet 34, this current finds the armature of relay 61 in its operated position so that the battery is applied over the front contact of relay 61 to the armature of relay 62. Assuming relay 62 is not operated the current is extended over the armature and back contact of relay 62 to the operating winding of magnet 33. If relay 62 had also been found operated, thus excluding magnet 33, the battery would have been extended over, in this case, the front contact and left-hand armature of exclusion relay 63 to the operating winding of magnet 36 thus selecting coil A. (The fact that relay 63 is operated, as noted above, excludes the selection of coil E by magnet 32.)

Instead of transferring a conductor such as 86 to the next succeeding conductors in the order 87, 88, etc. until an unused selecting coil is found, a different order of transfer can be used so as to complicate the scheme of exclusion and also to avoid the occurrence of originally adjacent elements in the scramble.

One transmitting brush 51 is illustrated as making contact with an operated contactor 44, thus applying ground over conductor 91 and when the corresponding TR switch 72 is in T position causing operation of relay 69 which closes its switch 71 in switching box 37 and connects coil D over the TR switch in box 37 to the transmitting branch 26. The energizing circuit for relay 69 continues from the ground applied over conductor 91 and brush 51 through the winding of relay 69 to conductor 93 leading to brush 54. Relay 69 has a locking armature which locks the relay up as long as battery continues to be supplied from brush 54. The timing of the code relays is, therefore, carried out under control of the special segmented ring 53 which relaxes the design requirements on the contactors 41, etc. of the commutator 30. It is only necessary that the operated contactors are applying ground to the energizing circuit of the corresponding code relay at the time of making contact between brush 54 and the corresponding segment 53 and that the contactor shall have removed ground from the corresponding brush before brush 54 passes off segment 53.

Assuming that the TR switches are thrown to the R position, at the instant indicated at the drawing, a ground is applied from the second lowest receiver brush 52 and operated contact 42 over conductor 92, corresponding TR switch 72 to the winding of relay 67, resulting in the selection of coil B. One advantage in having a separate set of brushes for receiving is that these brushes as a group may be arranged for adjustment to the right or left in FIG. 1 to compensate for transmission path delay. In the case of a long transoceanic radio channel, for example, the delay may amount to an appreciable quantity which can readily be compensated for by shifting the receiver brushes 52 relative to the transmitter brushes 51.

One feature of the present invention is that the one set of exclusion relays and one memory or storage means can serve for both regular and interlace coding. When the brushes 54 pass off a segment 53 and in the brief instant before either brush makes contact with the next segment, all operated relays are restored to unoperated condition. The locking circuits for code relays 66 to 70 are opened restoring these relays and the energizing circuits for relays 60 to 63 and 78 are opened restoring all of these relays. The memory function is carried out by mechanical displacement of the contactors so that it is unnecessary to store code data by such means as locked relays, for example. So far as the coding and exclusion relays are concerned, therefore, it is immaterial whether a vertical row of the contactors (in FIG. 1) which presents itself to the brushes 31, 51 or 52 belongs to a regular or interlace code element. In either case, when brush 54 applies battery to the relay circuits the proper relays operate under control of the operated contactors to select the proper tape coils and to exclude the proper selector magnets 32 to 36.

Reference has been made above to the use of either one scrambler, such as 28, or to scramblers 28 and 29, scrambler 28 being considered the "regular" scrambler and scrambler 29 the "interlace" scrambler. The drawing illustrates how these two scramblers can be used each to supply its own code through a common set of exclusion relays to the regular and interlace segments of the commutator 30, in case it is desired to use two scramblers in this manner. It should be pointed out, however, that a single scrambler 28 can supply both codes by timing the operation so that battery is furnished over the leads 65 in irregular manner each time a new set of commutator segments comes under the selector magnets 32 to 36. The use of a single scrambler results not only in simplification of the apparatus but actually appears to have a higher degree of secrecy than if two separate scramblers are used. It should be noted that even with only one scrambler, there is generated a truly interlaced code since the exclusion process is carried out with respect to every other vertical row of segments of commutator 30 instead of between each vertical row and the next. If only the single scrambler 28 is to be used, relay armature 76′ of relay 63 should be omitted and both brushes 56 and 57, to be described presently, should be tied directly together. The remainder of the description will, however, be on the assumption that both scramblers 28 and 29 are used, in order to set forth the manner of their use and relative timing.

The scramblers 28 and 29 are chosen in alternation by the respective brushes 56 and 57 which supply battery alternately to the scramblers from staggered segments 53 via operated contacts of armatures 76 and 76′ of exclusion relay 63. These scramblers are of the same type of construction but operate independently of each other as to the coding pulses which they supply, each scrambler operating to apply battery in as near random manner as possible to the conductors of group 65.

Referring to scrambler 28 of FIG. 1 and FIG. 4, the shaft 100 does not rotate but serves as a fixed axle for the gears 101, 102 and 103, drums 104 and 105 and sectored discs 106. Motor 107 drives pinion shaft 108 carrying three pinions as shown cooperating with gear wheels 101, 102 and 103, the ratios for these three sets of gears being slightly different such as 151, 150 and 149 by way of example. Gear wheel 101 is secured to drum 104 by pin 110 so that drum 104 rotates at the same speed as gear wheel 101. Similar pins secure drum 105 to gear wheel 102 and discs 106 to gear wheel 103. The drums and discs are insulated from axle 100 by insulating bushings 111 of fiber or other suitable material.

Each drum has irregularly positioned pins 112 in five circumferential rows all electrically joined to a slip ring on the drum, or the entire drum is of metal with a bearing space for a brush 81 at one end. Each drum has five brushes 83 for making momentary electrical contact with the pins, only one pin being in contact with a brush at one time on one drum. The five brushes of both drums are multipled to the five conductors 65. The discs 106 have irregular cut-outs around their peripheries and cooperating brushes 113 and a special slip ring on which rides a brush 114 connected permanently to ground. It is the purpose of discs 106 and brushes 113 and 114 to energize relay 78 at different times in accordance with an irregular scheme so as to cause its armature to switch the battery lead 77 back and forth between brushes 81 and 115 thus selecting either drum 104 or 105 in irregular order to supply the coding pulses. The order can be changed readily by withdrawing the driving pin 116 (FIG. 4) and shifting the angular position of one disc 106 relative to the other from time to time and reinserting the pin; also either or both discs can be turned end for end; also a set of interchangeable discs can be provided. This construction permits a long coding cycle before repetition occurs. It is to be noted that depending upon the operation of the exclusion relays, any given sequence of pins in the drum can cause any sequence of choices in the coding relays, since any impulse coming over leads 65 can cause any of magnets 32 to 36 to operate, depending on past history.

As stated heretofore, motor 107 may be the same motor which drives the tape 22 and commutator 30 and its speed is maintained highly constant in known manner to enable proper synchronous operation of the station equipment with that of other stations. The actual time of contact between a pin 112 and brush 83 need be no longer than is sufficient to insure operation of a selector magnet 32 to 36, and can occur at any time in the interval in which battery is applied over lead 77.

The drums on a scrambler are not limited to two in number, and a greater length of code cycle is obtainable by using more than two drums.

The invention is not to be construed as limited to the particular structural or circuit details that have been shown for this one illustrative embodiment since various modifications can be made within the spirit and scope of the claims.

What is claimed is:

1. In a privacy system having means for delaying transmission or reception of signal elements by variable times, a plurality of devices for determining different amounts of delay to be introduced into different signal elements and means to selectively and individually actuate said devices comprising storage elements, means to record a control bias on individual storage elements for later actuating said devices and means for preventing recording of control bias upon any two storage elements that would cause the same signal element to be transmitted twice.

2. In a privacy system, means for delaying signal transmission including a plurality of selectable devices for selectively varying the delay, a mechanically storing electrical commutator having displaceable contactors, a scrambler for causing selective displacement of said contactors, means controlled by said displaced contactors for excluding selective displacement of contactors that would cause erroneous selection of said devices and means controlled by said displaced contactors to selectively operate said devices.

3. In a privacy system for signals in which the signals are divided into short segments which are rearranged in abnormal order, devices for introducing variable delay times in said signals, a mechanically storing distributor having displaceable elements, means for selectively displacing said elements, means for selectively operating said devices in accordance with the displaced elements, and means controlled by said displaced elements for modifying the selective displacement of succeeding elements.

4. In a privacy system, a scrambler, a mechanically storing distributor having displaceable elements, means selectively displacing said elements under control of said scrambler, means for modifying the control of said displacing means by said scrambler and means to determine operation of said modifying means in accordance with said displaced elements.

5. A system according to claim 4 including a plurality of signal coding devices and means individually operating said devices under control of said displaced elements.

6. In a signal coding system, a plurality of coding devices for introducing alterations in signal currents dependent upon previously effected alterations, comprising a moving surface having normally aligned rows of mechanically displaceable elements, means to selectively displace any of said elements out of its aligned row, means engageable by displaced elements only for actuating said devices, and further means engageable by said displaced elements for conditioning operation of said selectively displaceable means.

7. In a signal coding system, a plurality of coding devices for effecting alterations in signal currents dependent upon previously effected alterations in the signal currents, comprising a moving surface having normally aligned rows of mechanically displaceable elements, a plurality of selectors cooperating with the several rows, means for variable operating said selectors to select elements and displace them out of alignment with other elements of the same row, exclusion means operated by already displaced elements for modifying the selection and displacement of elements by said selectors, and means selectively operating said devices in accordance with displaced elements in the different rows.

8. In a signal coding system, a rotating drum having circumferentially aligned rows of mechaniscally displaceable elements, a selector per row for displacing elements out of alignment with elements of the row that have not been displaced, brushes engageable only by displaced elements, circuits for variably operating said selectors, switches in said circuits for interconnecting certain of said circuits with others to change the connections between said circuits and the respective selectors, means controlled by contact between said brushes and said displaced elements for operating said switches, a signal coding device per row and means controlled by said displaced elements for actuating said devices.

9. In a signal coding system, a plurality of coding devices, parallel rows of mechanical elements, one row per device, a common carrier for moving all of said rows together in the direction of the rows, means to selectively displace elements in each row out of their normal alignment with one another, one set of brushes positioned to engage only the displaced elements to control coding of signals for transmission, another set of brushes lagging said first set and positioned to engage only the displaced elements to control decoding of received coded signals, means to adjust the amount of lag of said second set with respect to said first set of brushes, and circuits for said coding devices closed by engagement of the several brushes of either set with the displaced elements of the respective rows.

10. In a signal coding system, signal coding devices, a selector for each device, and means for variably operating said selectors comprising rotary contact drums having irregularly spaced contact members around their peripheries, circuits for said selectors adapted to be closed by respective contact members, means for driving said drums with slightly different rotational periods, and means for enabling the contact members of said drums, one drum at a time in irregular sequence, to control closures of said circuits.

11. The invention of claim 10 in which said last means comprises rotating contact discs and cooperating brushes for variably energizing the contact members of respective drums, said discs having cut-out portions of irregular angular width and position.

12. In a signal coding system, a rotating drum having peripheral channels with shoulders jutting from the walls of the channels toward each other leaving a peripheral slot between said shoulders, said channels being wider beneath said shoulders than said slots, inverted V-shaped springs each having outwardly bent feet on the ends of the V and resting in said channels with the apex of the V extending radially outward through the slot, each channel and slot being substantially filled with said springs, said springs having two stable positions in each of which the feet exert outward pressure against the corner formed by the bottom of the channel and one side wall and against the diagonally opposite corner formed by the junction of the opposite side wall of the channel with its shoulder, means to move said springs laterally from one of said two stable positions to the other and brushes engaging said springs when the latter are in one of said two stable positions.

13. In a privacy system, a succession of delay devices for introducing different amounts of delay in signals to be transmitted or received, two scramblers for alternately setting up arbitrary code designations to determine the selection of said devices individually for coding or decoding signals, and a single exclusion means serving to modify the selection of said devices in response to code designations set up by either scrambler depending upon which of said devices have previously been selected.

14. The invention according to claim 13 in which said exclusion means comprises storage means for recording previous selections of said devices and a group of switching relays controlled from said storage means for translating non-usable code designations to usable code designations.

15. In a privacy system, a succession of delay devices for introducing different amounts of delay in signals to be transmitted or received, a signal storage means for storing code designations in successive time intervals in advance of use, scrambler mechanism for supplying code designations to be set up in said storage means, and exclusion means for modifying code designations supplied into code designations whose character depends upon previously stored designations, said exclusion means modifying the designations to be stored in alternate time intervals in accordance with code designations previously stored only in intervening time intervals.

16. In a selecting and controlling system, a multiplicity of control elements for selective operation, means to select said elements one at a time in each of a succession of definitely timed intervals, means operative in each of a succession of time intervals to determine under control of a previously selected element an element to be excluded from selection in that particular time interval, said last means operating to select a different element from that which is excluded, a plurality of circuits to be controlled, and means operative in a subsequent succession of definitely timed intervals to utilize the selected elements one at a time in successive time intervals to exert a control upon a corresponding one of said circuits.

References Cited in the file of this patent

UNITED STATES PATENTS

| | | |
|---|---|---|
| 1,416,765 | Vernam | May 23, 1922 |
| 1,606,763 | Hartley | Nov. 16, 1926 |
| 2,132,205 | Dickieson | Oct. 4, 1938 |